United States Patent [19]

Danos

[11] 4,301,472
[45] Nov. 17, 1981

[54] VIDEO DISPLAY SYSTEM WITH SHADING CIRCUIT FOR SELECTIVELY VARYING INTENSITY OF VIDEO DISPLAY

[75] Inventor: Michael Danos, Washington, D.C.

[73] Assignee: Damox Laboratories, Inc., New York, N.Y.

[21] Appl. No.: 141,011

[22] Filed: Apr. 17, 1980

[51] Int. Cl.³ .............................................. H04N 3/16
[52] U.S. Cl. ................................... 358/163; 315/386; 358/220
[58] Field of Search ................. 358/220, 163; 315/386

[56] References Cited

U.S. PATENT DOCUMENTS 3,588,338  6/1971  Dischert et al. ..................... 358/163

Primary Examiner—Robert L. Richardson
Attorney, Agent, or Firm—Howard L. Rose

[57] ABSTRACT

A control circuit is provided in a video display system that is responsive to the horizontal and vertical deflection signals to produce a shading signal including a plurality of signal components corresponding to independently variable linear and higher order functions (preferably conic functions) of the deflection signals, to modify the video signal and control the intensity of the video display at locations that are functions of the excursions of the sweep signals along their time bases. In the manually controlled embodiment of shading, a differential amplifier is employed to combine the video signal with the shading signal to produce a shaded video signal and to selectively control the intensity in the video display. The system may be employed in conjunction with a window amplifier to independently control the position of the various components of the video signal on the gain curve of the window amplifier whereby to alleviate problems of burn-out or excessive darkness of various elements of the display. In an automatically controlled embodiment of shading, the video signal is combined with, in a disclosed embodiment, nine different shading voltages each relating to a different area of the screen for controlling shading in each such area.

33 Claims, 16 Drawing Figures

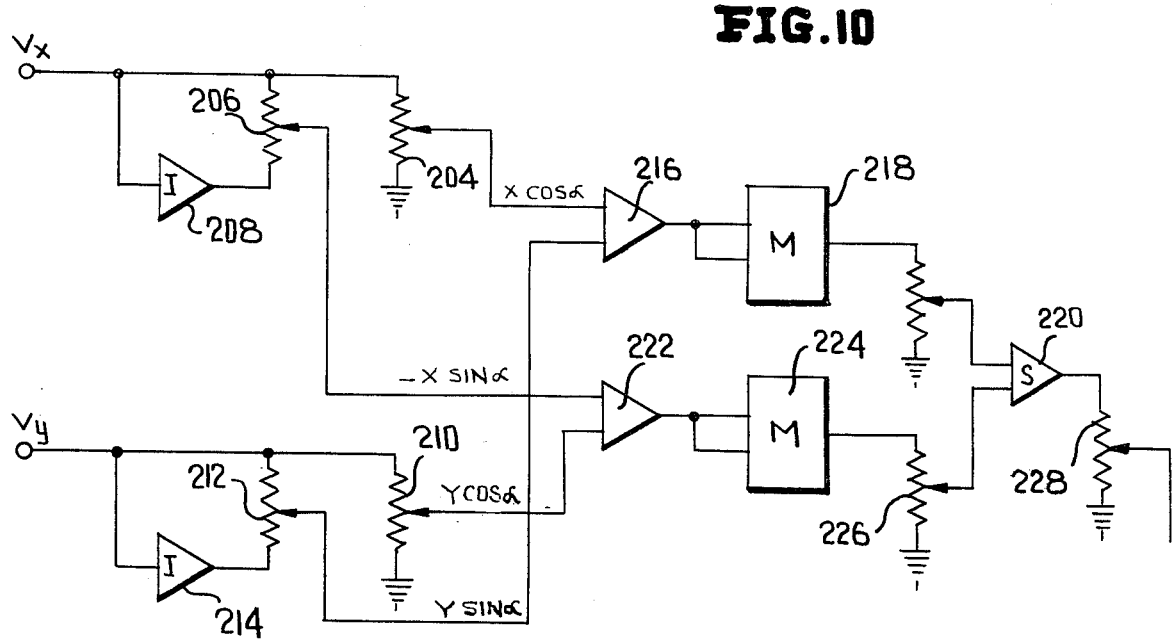
FIG. 10
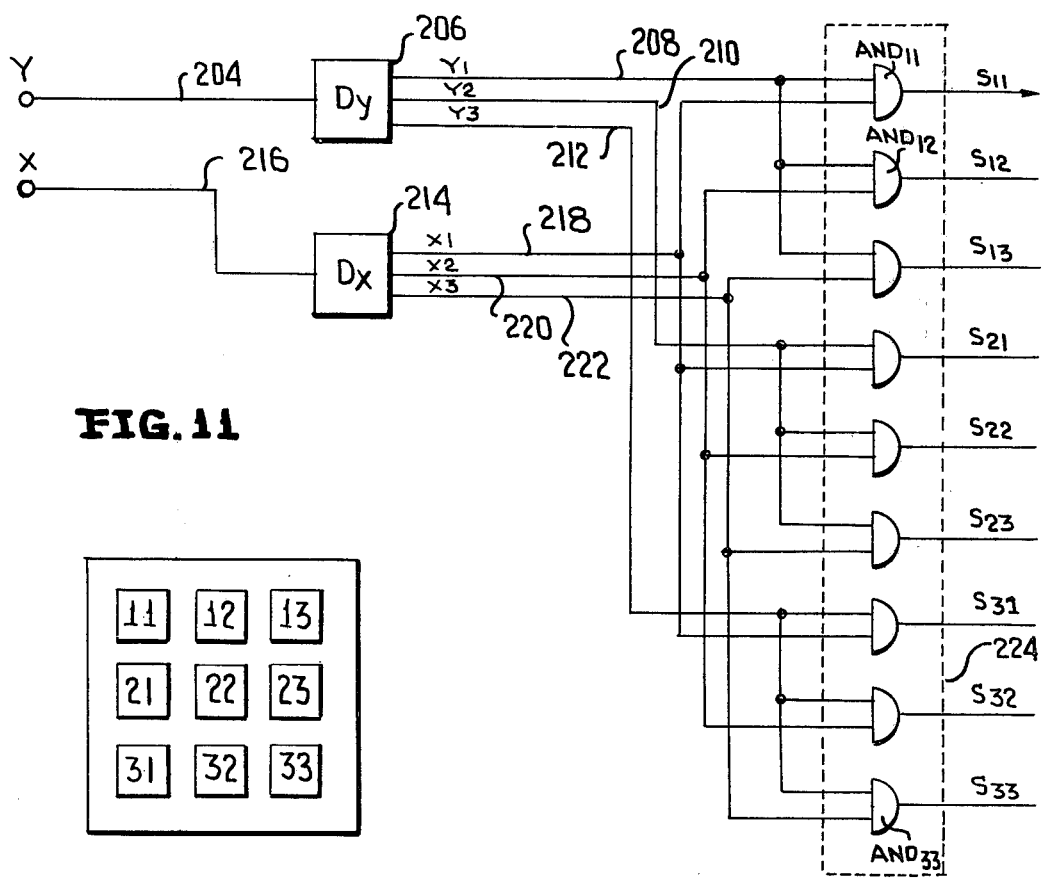
FIG. 12
FIG. 11

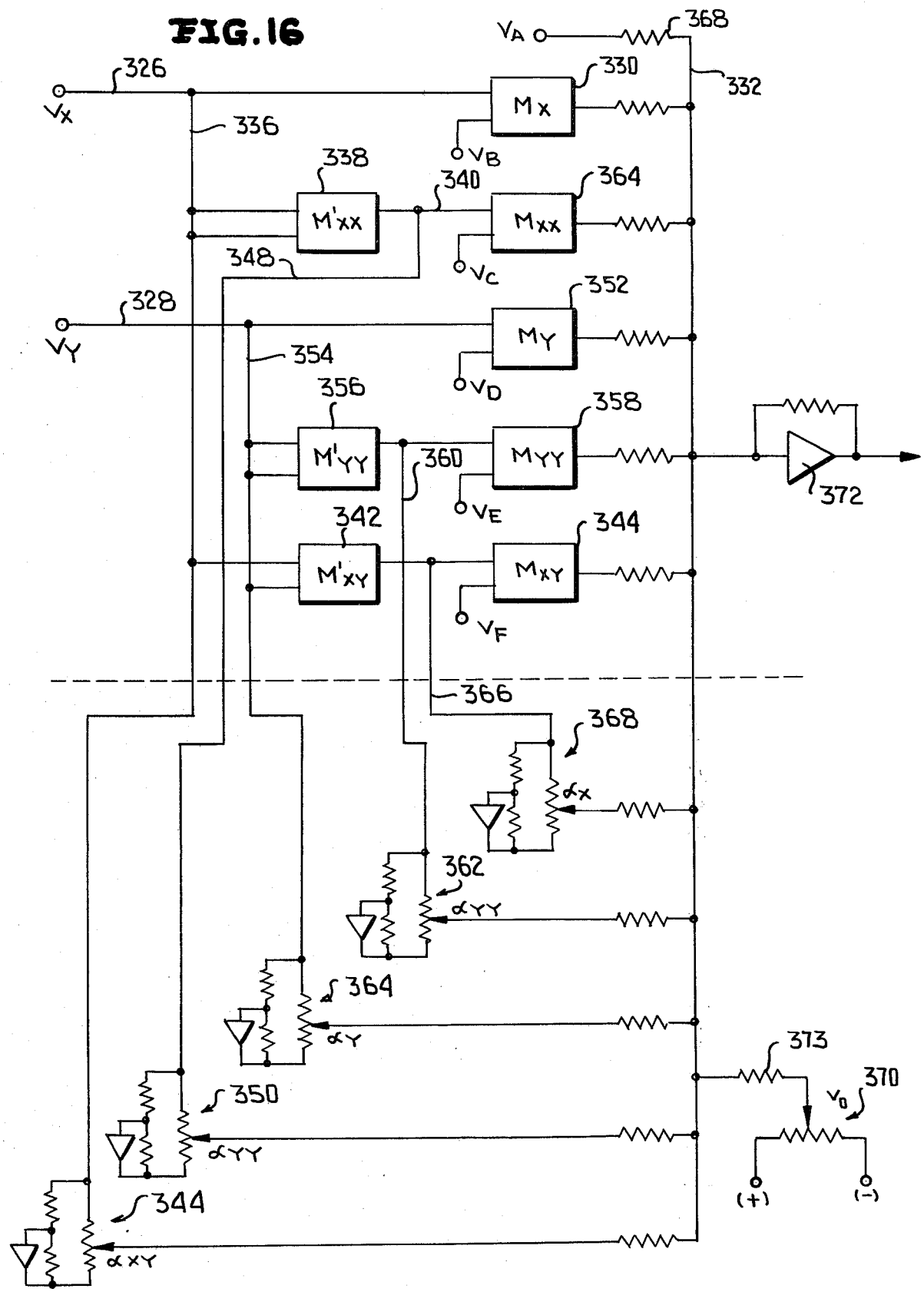

VIDEO DISPLAY SYSTEM WITH SHADING CIRCUIT FOR SELECTIVELY VARYING INTENSITY OF VIDEO DISPLAY

TECHNICAL FIELD

The present invention relates to a shading technique for selectively varying the intensity of a video display and more particularly, to a method and system for selectively adjusting the intensity of selected regions of a video display to improve the visibility of the subject matter shown in the display. The shading technique is especially suitable for use in conjunction with the circuitry of my co-pending patent application Ser. No. 921,886 entitled "Visibility Expander" and now U.S. Pat. No. 4,229,764 for analysis of x-ray photographs by medical doctors and technicians where it is frequently desirable to focus attention on the information shown in a relatively small section of the photograph, while at the same time maintaining the ability to see the picture in as large as possible area surrounding the section of particular interest.

BACKGROUND OF THE INVENTION

It is well known to utilize a video display system in the analysis of x-ray photographs and other subjects. Typically, a television camera is employed to scan the x-ray photograph and produce video signals which are applied to a video display device, e.g., a television monitor, to reproduce the scanned photograph in a video display. Such systems advantageously allow adjustment of the brightness and contrast of the video display to more distinctly reveal the information depicted in the x-ray photograph. Normally, the adjustment features of the video system simultaneously affect the entire video display with the result that all parts of the display are subject to exactly the same level of adjustment. This type of total adjustment in brightness or contrast provides little or no assistance in achieving a more distinct and useful video display when analyzing areas of the x-ray photograph where the information is obscured by excessive brilliance or darkness. In addition, low contrast areas of the x-ray photograph are difficult to analyze by simple adjustment of brightness or contrast which may well serve to obscure the desired information. These problems are especially encountered in attempting to use x-ray photographs in the diagnoses of soft tissue maladies, e.g., breast cancer, or in detection of items such as plastic explosives in luggage examined by x-ray equipment at airports and other security areas.

In applicant's aforesaid co-pending application, a video display system is disclosed for concentrating signal components of interest in the low frequency range and utilizing a low-pass filter to eliminate high frequency signal components (noise) from the video signal. The filtered video signal is applied to a window amplifier to expand the visibility over a selectable range of signals. The system improves the visibility in the video display by adjusting the expansion factor and mid-point of the window amplifier to enhance the image contrast of that portion of the image of particular interest in the investigation. However, since the contrast adjustment achieved by applicant's visibility expander system affects the entire video display image, information in specific areas which cover a wide range of contrasts is often partially obscured by burn-out and/or complete darkness for the viewing surface; the same result occurring in other areas of the video display with high brightness levels making viewing difficult. The resulting burn-outs and darknesses tend to obscure the information contained in the x-ray photograph as well as making it difficult for the eye to adjust to the extremes in brightness of closely adjacent viewing regions. Similarly, areas of excessive blackness may appear on the video display which also obscure the desired information.

These areas of excessive brightness or blackness are extremely difficult to improve with conventional brightness and contrast adjustments. Moreover, even with applicant's improved visibility expander system, the adjustment of the window amplifier to operate on signals of predetermined amplitude in its high gain range may simultaneously serve to generate areas of excessive brightness and blackness in the video display which actually contain important information not visible on the video display. Thus, an improved video system which allows a great expansion of image contrast to permit differentiations between adjacent regions of slight contrast differences, such as are encountered in viewing soft tissue abnormalities while concurrently permitting control of excessive contrast in selected regions, is of great importance. This capability allows the important areas of an x-ray photograph to be thoroughly scrutinized.

Accordingly, it is a primary object of the present invention to provide a video display system which has the capability of concentrating on and improving the visibility of information in particular areas of the video display.

Another object of the invention is to provide a video diaplay system which is readily adjustable to eliminate areas of excessive brightness and darkness from the video display while permitting a great expansion of contrast in adjacent or selected other regions.

It is also an object of the invention to provide an improved video display system which is more effective in distinguishing detail in low contrast regions of the video display while concurrently permitting the reduction of excessive brightness or darkness in selected regions.

A further object of the invention is to provide a video display system in which the video signal is modified by a shading signal having signal components corresponding to linear and non-linear functions of the horizontal and vertical deflection signals to vary the intensity of the video display at selected regions selectable by the use of the sweep signals utilized to produce the position variable shading signals.

It is a further object of the invention to provide a video display system in which a shading circuit is utilized to modify the video signal by superimposing independently variable quadratic and linear signal components of the video sweep signals to selectively vary the intensity of the video display as a function of the region of the display.

Yet another object of the present invention is to provide a shading circuit for automatically controlling the intensity of the display.

SUMMARY OF THE INVENTION

The above objectives are achieved in a video display system utilizing horizontal and vertical deflection signals having negative to positive excursions and a video signal to produce a video display. A control circuit is provided that is responsive to the horizontal and vertical deflection signals to produce a control signal (the shading signal) including a plurality of manually variable signal components corresponding to independently variable linear and higher order functions of the deflection signals, to modify the video signal and control the intensity of the video display at locations that are functions of excursions of the sweep signals along their time bases. A differential amplifier is employed to combine the video signal with the shading signal to produce a shaded video signal and to selectively control the intensity of the video display.

The capability of the control circuit to adjust independently the magnitude and sign of the linear and higher order signal components allows various modifications of the video display to be accomplished. For example, a video display containing adjacent bright and dark areas can be shaded to darken the bright area and lighten the dark area each independent of the other and each to a degree selected by the observer. In addition, a video display containing a bright spot surrounded by a dark area can be modified to decrease the intensity of the surrounding dark area by selective adjustment of the higher order, e.g., quadratic, signal components.

In addition, the control circuit may include refinements which allow signal components corresponding to trigonometric functions to be incorporated in the shading signal. For example, to shade out isodensity lines which are elliptical in configuration, the control circuit may be provided with nonlinear elements to introduce sine and cosine functions into the shading signal as explained in more detail below.

Preferably, the shading means is embodied as multiplier means responsive to the horizontal ($V_x$) and vertical ($V_y$) deflection signals for producing an output including quadratic components proportional to $(V_x)^2$, $(V_xV_y)$, and $(V_y)^2$, and summing means responsive to the output of the multiplier means and to the horizontal ($V_x$) and vertical ($V_y$) deflection signals for producing an output proportional to the summation of $(V_x)^2$, $(V_xV_y)$, $(V_y)^2$, $(V_x)$ and $(V_y)$. The shading means also includes a threshold control for adjusting the operating threshold of the summing network. The signal combining means is preferably embodied as a differential amplifier responsive to the video and shading signals for producing an output corresponding to the difference between the video signal and the shading signal.

A second preferred embodiment of the invention relates to a circuit for automatically controlling shading as a function of the intensity of the control signal. Control is affected by arbitrarily dividing the display scrren into a specified number of equal area regions; for instance 9 regions, integrating the video signal in such region and controlling the gain of other video signals displayed in each such region as a function of the aggregate of the integrated signals to control thereby the relative intensities in each of the aforesaid areas whereby the range of intensities does not either black out or burn out the display.

The basic equation for developing a shading control signal in the automatic mode is:

$$V = A + Bx + Cx^2 + Dy + Ey^2 + Fxy$$

where A through F are coefficients while x and y are the horizontal and vertical positions respectively on the TV picture. The values x and y are proportional to the deflection signals, i.e. to the deflection voltage for electrostatic deflection, or to the deflection current for magnetic deflection. It can be shown that the individual coefficients A through F are solved by the following equations:

$$A = 1/9(-V_{11} + 2V_{12} - V_{13} + 2V_{21} + 5V_{22} + 2V_{23} - V_{31} + 2V_{32} - V_{33}) \quad (2)$$

$$B = 1/6(-V_{11} + V_{13} - V_{21} + V_{23} - V_{31} - V_{33}) \quad (3)$$

$$C = 1/6(V_{11} - 2V_{12} + V_{13} + V_{21} - 2V_{22} + V_{23} + V_{31} - 2V_{32} + V_{33}) \quad (4)$$

$$D = 1/6(V_{11} + V_{12} + V_{13} - V_{31} - V_{32} - V_{33}) \quad (5)$$

$$E = 1/6(V_{11} + V_{12} + V_{13} - 2V_{21} - 2V_{22} - 2V_{23} + V_{31} + V_{32} + V_{33}) \quad (6)$$

$$F = 1/4(-V_{11} + V_{13} + V_{31} - V_{33}) \quad (7)$$

where $V_{11}$ is the integrated video signal for the upper left 1/9 of the screen $V_{12}$ and $V_{13}$ are the upper middle and right 1/9's of the screen respectively, $V_{21}$, $V_{22}$ and $V_{23}$ are the left, middle and right 1/9's respectively of the middle horizontal row of areas, etc.

The nine integrated video signals thus produced are combined in a matrix with appropriate inverters summing and dividing networks to produce the signals A–F of equations 2–7. Each of the coefficients is then applied to the multiplier which carries its associated x or y term, the results being summed to produce the voltage of Equation 1.

In a preferred embodiment of the video display system, a shading circuit is employed in combination with a low pass filter and window amplifier to provide a video signal which is modified by a shading signal including signal components corresponding to quadratic and linear functions of the deflection signals to selectively control the intensity of selectable regions of a video display. The low pass filter is employed to eliminate high frequency noise components from the video signal. The purpose of the window amplifier is to enhance the contrast between video signals in a predetermined amplitude range to provide a more distinct differentiation between soft tissues of only slightly differing densities which produce little contrast between adjacent regions. In such low contrast regions extend into very light areas of the x-ray or the visual display, burnout may occur resulting in loss of adjacent information which may be important to a full understanding of the display or which may be of sufficient brightness to prevent the eye from adjusting to the low contrast levels to be detected. The shading circuit allows the video signal to be selectively modified by signal components corresponding to linear and higher order functions of the deflection signals to selectively adjust the intensity of particular portions of the video display selected by adjusting the functions of the deflection signal to produce the desired signal change at the desired location. The video and shading signals are combined by a differential amplifier which produces an output corresponding to the difference between the video signal and the shading signal. This shaded output signal is, in turn, applied to the window amplifier. Alternatively, the negative input of the window amplifier itself can be used to provide the difference between the signal voltage and the shading voltage. As a result, the video signals corresponding to a particular area of concern in the video display are more effectively processed by the window amplifier in the desired gain region thereof. Consequently, by appropriate adjustment of the signal components produced by the shading circuit, areas of excessive brightness (burn-out) can be reduced in intensity to more distinctly display the information contained in these areas.

Accordingly, the video display system of the present invention allows a more thorough analysis to be performed on a subject such as an x-ray photograph by adjusting the system to focus on particular areas of concern in the overall video display and by adjusting the display to eliminate area of excessive brightness and darkness.

DESCRIPTION OF THE DRAWINGS

The accompanying drawings illustrate a preferred embodiment of the present invention, and, together with the description, serve to explain the principles and operation of the invention.

FIG. 10 illustrates an alternative shading circuit which may be incorporated in the video display system;

FIG. 11 illustrates a division of the TV display screen suitable for use with an automatic shading control voltage generator;

FIG. 12 is a circuit diagram of a gating voltage generator for use in the distribution of signals in accordance with the screen division of FIG. 11;

FIG. 16 is a circuit diagram illustrating the combination of automatically and manually generated shading control voltages as applied to the circuits for generating the independent variables of Equation 1.

DESCRIPTION OF THE PREFERRED EMBODIMENTS

Figure 1:
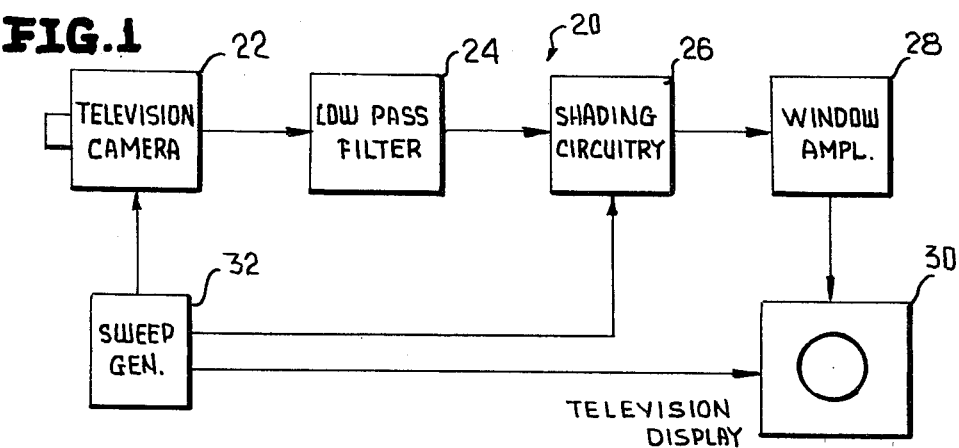
FIG. 1 is a simplified block diagram of the video display system of the present invention.

Referring to FIG. 1, a video display system for use in analysis of x-ray photographs and other subjects is shown in the block diagram. The system includes a television camera 22 connected by a low pass filter 24, shading circuitry 26, and a window amplifier 28 to a television display 30. In general, any standard source of video signals may be employed such as video discs, tapes, etc. either analog or digital through a D-A Converter. A sweep generator 32 provides sync and deflection signals to operate television camera 22 and television display 30. The x-ray photograph or other subject to be analyzed is scanned by television camera 22 while an operator views an image of the photograph produced on television display 30. Television camera 22 produces a video signal which is applied to low pass filter 24 to eliminate high frequency noise from the signal. The filtered video signal is applied to shading circuitry 26 to allow the operator to selectively adjust the shading of the image in a particular region of the video display. The shaded video signal is applied to window amplifier 28 which selectively expands the video signals within a desired amplitude range. As explained in applicant's co-pending U.S. application Ser. No. 921,886, the low pass filter eliminates high frequency noise from the video signal and the window amplifier enhances the video display by allowing low-contrast signals to be expanded. Preferably, the expansion factor and the mid-point of the window amplifier are variable to permit the operator to selectively adjust the contrasts in the video display.

In accordance with the present invention, shading circuitry 26 is employed to selectively vary the intensity of particular regions of the video display in response to the deflection signals produced by sweep generator 32. The shading circuitry modifies the filtered video signal produced by low pass filter 24 to more effectively maintain the varying magnitude of selected components of the video signal within the linear expansion range of the window amplifier. The overall purpose of the shading circuitry is to allow the operator to selectively superimpose a shading signal including signal components corresponding to linear and non-linear functions of the deflection signals on the video signal to vary the location of the various video signals, as a function of position in the x-ray, on the gain curve of the window amplifier to permit various types of shading to be achieved.

Figure 3:
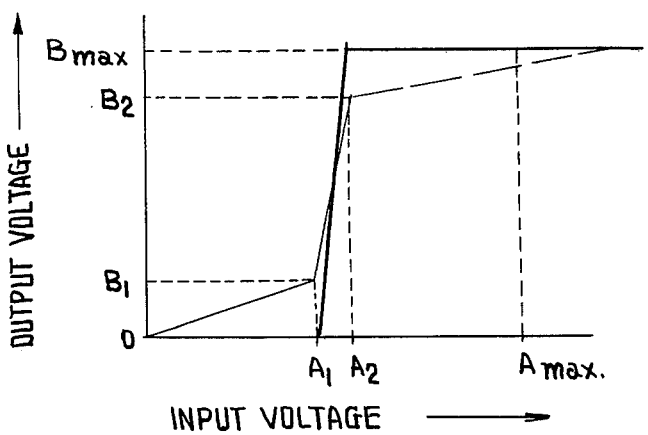
FIG. 3 illustrates the characteristics of a window or slice amplifier utilized in the video display system.

FIG. 3 illustrates the transfer characteristics of the window amplifier in a plot of output voltage as a function of input voltage. Curve 34 represents the characteristic of a saturating window amplifier which has a single straight line from zero output voltage to maximum output voltage, from $B_0$ to $B_{max}$, between input voltages $A_1$ to $A_2$. Curve 36 represents the characteristic of a non-saturating window amplifier which has a first slope from zero to $A_1$, a steeper slope between $A_1$ and $A_2$, and a lesser slope from $A_2$ to $A_{max}$. It is distinguishable from the saturating window amplifier in having three separate linear regions.

Because of the high gain of the window amplifier in the window between input voltages $A_1$ and $A_2$, there can result areas of excessive brilliance in the video display, particularly for input voltages at or above the upper limit $A_2$ of the window. This effect is known as burn-out. Likewise, for input voltages at or below the lower limit $A_1$ of the window, areas of excessive darkness or total blackness may appear in the video display. Since these areas of excessive brilliance and blackness may contain important information to be analyzed, or may in the case of excessive brilliance tend to blind the operator, it is essential to provide a circuit arrangement which permits such areas to be more effectively displayed and analyzed without losing the high gain of the $A_1$ to $A_2$ curve. Such an objective is the essential purpose of the shading circuitry which effectively allows selected regions of input voltages below $A_1$ and above $A_2$ to be brought within the window by selectively shading the video signal in response to the deflection signals.

Figure 2:
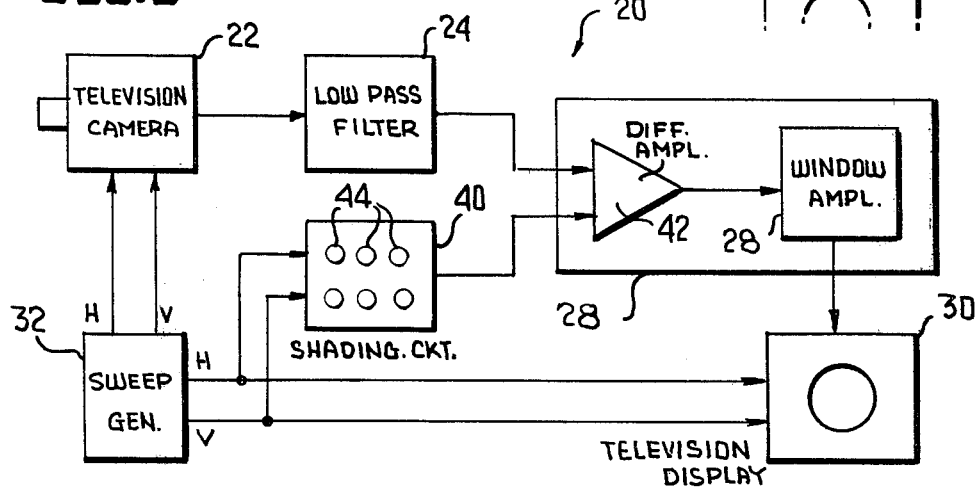
FIG. 2 is a detailed block diagram of the overall video display system of this invention.

As shown in FIG. 2, the shading circuitry comprises a shading circuit 40 responsive to the horizontal and vertical deflection signals produced by sweep generator 32 for producing a shading signal for modifying the filtered video signal produced by low pass filter 24. The outputs of low pass filter 24 and shading circuit 40 are applied to a differential amplifier 42 to produce an output signal corresponding to the difference between the filtered video signal and the shading signal. The shaded video signal is amplified by window amplifier 28 and applied to television display 30 for viewing by the operator. Shading circuit 40 is provided with a plurality of controls 44 which, as explained in more detail below, allow the components of the shading signal to be selectively controlled. Preferably, the shading signal includes a plurality of signal components corresponding to linear and higher order, e.g., quadratic, functions of the horizontal and vertical deflection signals. Controls 44 allow the magnitude and the sign of these components to be selectively varied to permit the operator to focus his attention on a particular region of the video display.

Figure 4:
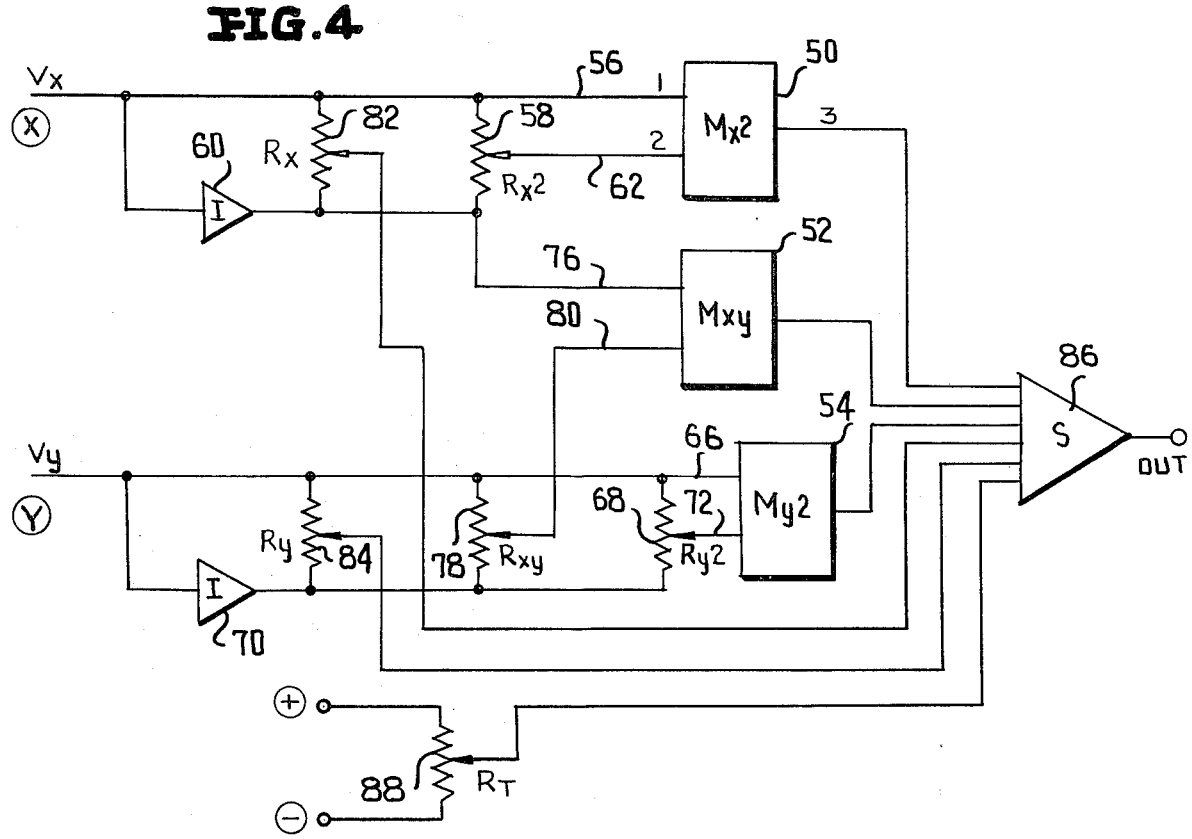
FIG. 4 is a schematic diagram illustrating the components of another embodiment of the shading circuit used in the video display system.

Referring to FIG. 4, a basic embodiment of the shading circuit includes a set of three multipliers 50, 52 and 54 for producing the higher order (quadratic) components of the shading signal. First multiplier 50 (designated $M_x^2$) includes a first input 56 which responds to the horizontal deflection signal ($V_x$) applied to one side of a potentiometer 58 (designated $R_x^2$). The horizontal deflection signal ($V_x$) is inverted via an inverter 60 and applied to the other end of potentiometer 58. A second input 62 of multiplier 50 responds via potentiometer 58 to a voltage which is variable between $+V_x$ and $-V_x$. The output produced by multiplier 50 is proportional to the product of $V_x$ and $AV_x$ of the horizontal deflection signal where $-1 \leq A \leq +1$ represents the multiplication factor of the second input signal. It should be noted that both deflections are linearly variable signals commencing at a maximum negative value and terminating at a positive value of preferably the same maximum value.

With potentiometer 58 set at its mid-point, the output of multiplier 50 is zero. The sign (+ or −) of the output signal is determined by the direction of movement of potentiometer 58 from its mid-point, i.e., whether both inputs are of the same or different signs. Similarly, multiplier 58 (designated $M_y^2$) includes a first input 66 which responds to the vertical deflection signal ($V_y$); such signal is also applied to one end of a potentiometer 68. The vertical deflection signal ($V_y$) is inverted via an inverter 70 and applied to the other end of potentiometer 68 coupled to a second input 72 of multiplier 54. Potentiometer 68 produces an output voltage which varies between $+V_y$ and $-V_y$. Multiplier 54 produces an output signal proportional to the product $V_y \times BV_y$ of the vertical deflection signal which can be adjusted in sign and magnitude via potentiometer 68.

Multiplier 52 (designated $M_{xy}$) includes a first input 76 responsive to the inverted horizontal deflection signal ($-V_x$) produced by inverter 60. Another potentiometer 78 (designated $R_{xy}$) is connected in parallel with potentiometer 68 and coupled to a second input 80 of multiplier 52 to provide an input proportional to the vertical deflection signal ($V_y$). Multiplier 52 produces an output proportional to the product of the deflection signals ($V_x V_y$) which is adjustable in sign and magnitude via potentiometer 78. Additional potentiometers 82 and 84 (designated $R_x$ and $R_y$) are connected in parallel with potentiometers 58 and 68, respectively, to provide adjustable output signals proportional to the horizontal ($V_x$) and vertical ($V_y$) deflection signals, yielding respectively voltages $DV_x$ and $EV_y$.

The shading circuit includes a summation network 86 having a set of inputs receiving the quadratic signal components produced by multipliers 50, 52 and 54 and the linear signal components produced by potentiometers 82 and 84. Summing network 86 combines these input signals to generate a shading signal $V_s$ as follows:

$$V_s = (V_x \cdot AV_x) + (V_x \cdot BV_y) + (V_y \cdot CV_y) + (DV_x) + (EV_y) \tag{8}$$

where the magnitudes of A, B, C, D, and E are determined by the settings of the corresponding potentiometers. In addition, the shading circuit includes another potentiometer 88 ($R_T$) coupled to summing network 86 which allows the operating threshold of the summing network to be adjusted.

Figure 5:
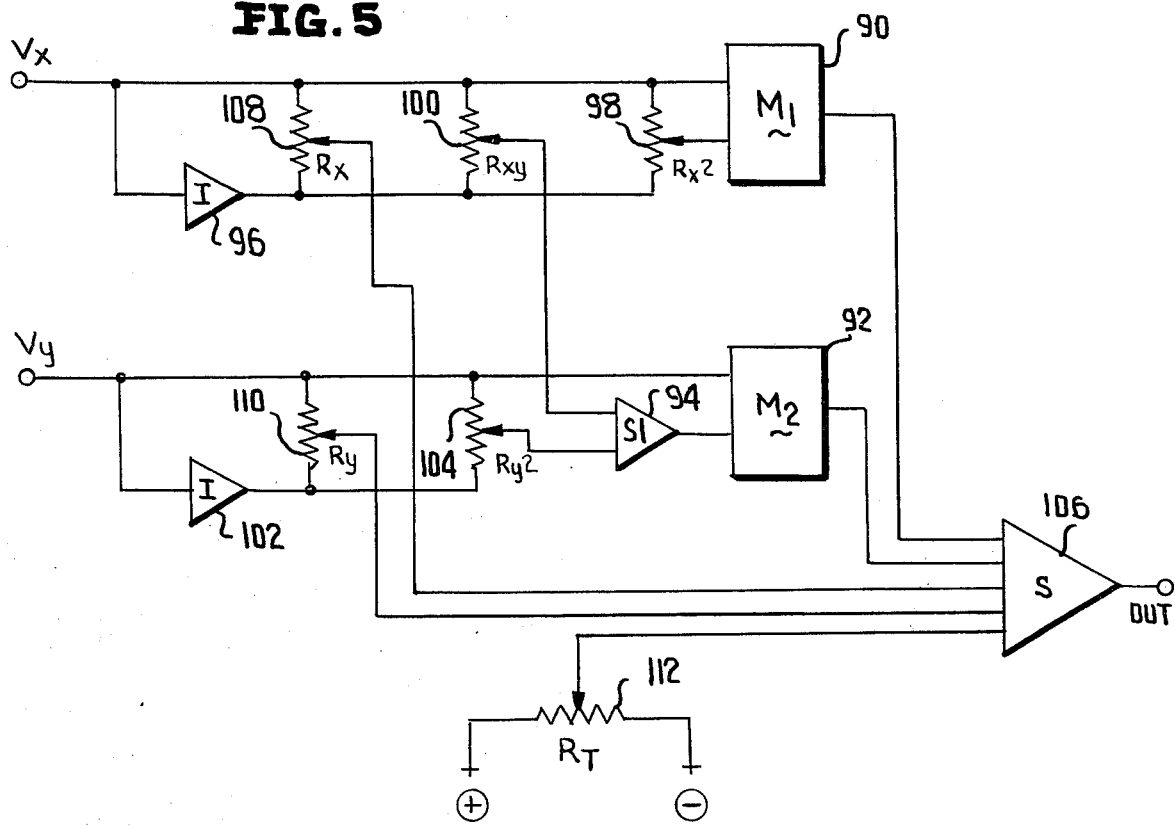
FIG. 5 is a simplified version of a shading circuit using only two multipliers.

Referring to FIG. 5, a simplified version of the shading circuit can be achieved with only two multipliers 90 and 92. Since the signal components of a quadratic equation can be alternatively defined according to the equation $$A(V_x)^2 + C(V_y)^2 + B(V_x V_y) = A(V_x)^2 + V_y(CV_y + BV_x) \tag{9}$$

it is apparent that one of the multipliers of the previous embodiment can be replaced by an appropriate summing network 94 to achieve the same overall result. Thus, in similar fashion to multiplier 50 (FIG. 4), multiplier 90 (FIG. 5) is responsive to the horizontal deflection signal ($V_x$) to produce an output proportional to the ($V_x \cdot AV_x$) of the deflection signal. The circuit includes an inverter 96 and a potentiometer 98 (designated $R_x^2$) which allow the magnitude and sign of the quadratic signal component produced by multiplier 90 to be adjusted.

A potentiometer 100 (designated $R_{xy}$) connected in parallel with potentiometer 98 provides an adjustable input proportional to the horizontal deflection signal ($V_x$) to summing network 94. An inverter 102 and potentiometer 104 (designated $R_y2$) are provided to supply an adjustable input proportional to the vertical deflection signal ($V_y$) to summing network 94. Multiplier 92 responds to the vertical deflection signal ($V_y$) and to the summation of the horizontal and vertical signals ($BV_x + CV_y$) produced by summing network 94 to produce an output proportional to the product of the horizontal and vertical deflection signals ($V_x V_y$) and the square ($V_y \cdot V_y$) of the vertical deflection signal. The quadratic signal components produced by multipliers 90 and 92 are applied to a summing network 106. Additional potentiometers 108 and 110 (designated $R_x$ and $R_y$, respectively) connected in parallel with potentiometers 100 and 104, respectively, provide linear signal components proportional to the horizontal ($V_x$) and vertical ($V_y$) deflection signals which are also supplied to summing network 106. As a result, the shading signal produced by summing network 106 includes quadratic and linear components proportional to the summation of ($V_x \cdot AV_x$), ($DV_x$), ($CV_x V_y$), ($V_y \cdot BV_y$) and ($EV_y$). Finally, a potentiometer 112 ($R_T$) is coupled to summing network 106 to allow the threshold of the summing network to be adjusted.

Figure 6:
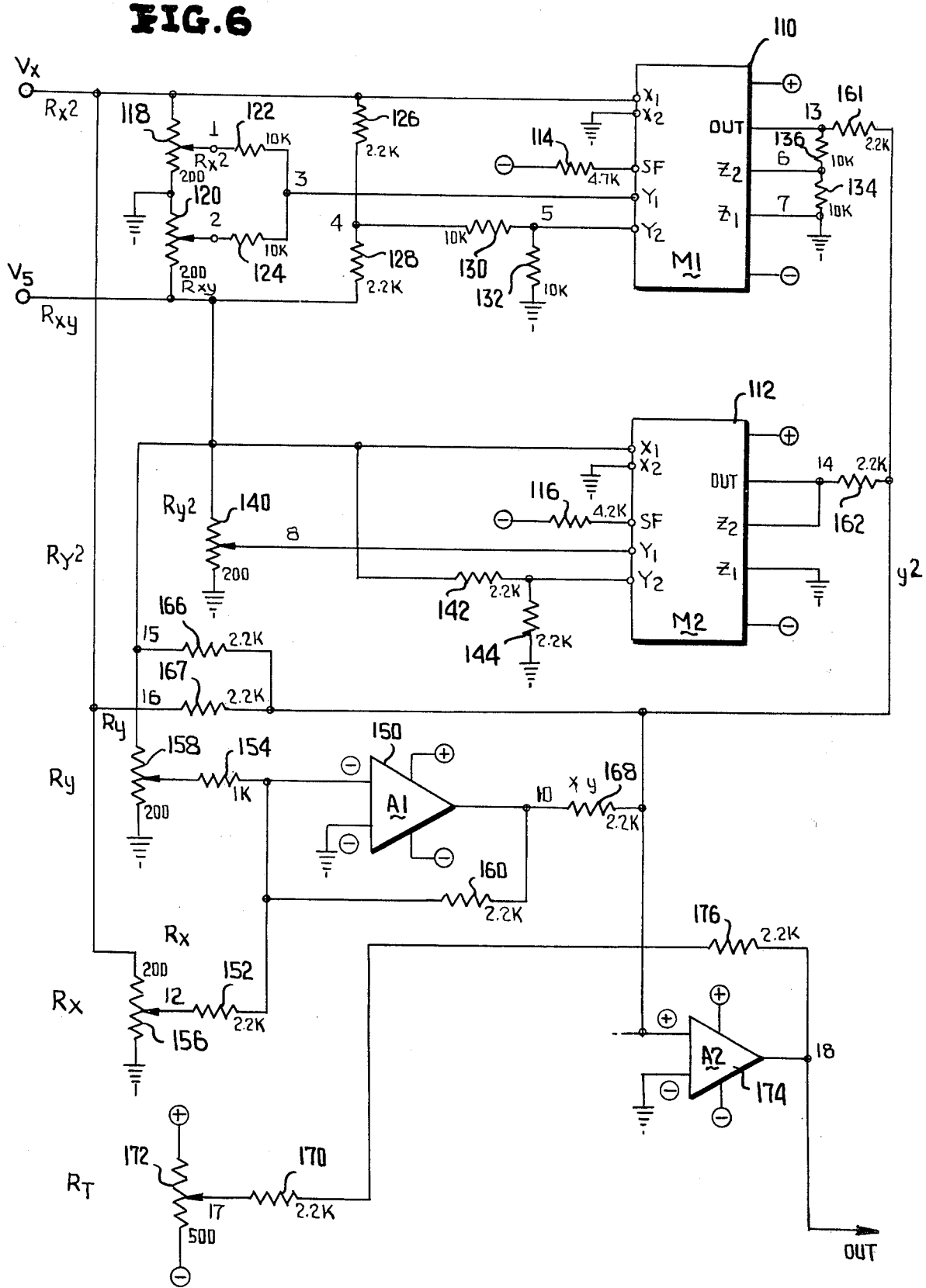
FIG. 6 is a detailed circuit diagram illustrating the components of a shading circuit constructed in accordance with the embodiment of FIG. 5.

Referring to FIG. 6, there is illustrated a circuit diagram of a preferred embodiment of the shading circuit, basically constructed in accordance with the circuitry of FIG. 5. The circuit includes a pair of multipliers 110 and 112 constituting standard circuit components. For example, each multiplier is an analog device type AD534 manufactured by Analog Devices. Each multiplier includes a scale factor (SF) terminal to which corresponding bias resistors 114 and 116 are connected. With a bias resistor of 4.7 kohms, each multiplier circuit yields a scale factor between 4 and 5 which is explained in more detail below. Each multiplier circuit includes input terminals $X_1$, $X_2$, $Y_1$ and $Y_2$ and output terminals $Z_0$, $Z_1$ and $Z_2$. Each multiplier operates according to the following equation:

$$V_{Z_2} - V_{Z_1} = \frac{(V_{X_1} - V_{X_2})(V_{Y_1} - V_{Y_2})}{SF} \qquad (10)$$

where SF is the scale factor determined by the resistor coupled to terminal SF.

The horizontal deflection signal ($V_x$) is applied to input terminal $X_1$ of multiplier 110 while input terminal $X_2$ is grounded. A pair of series connected potentiometers 118 and 120 (Designated $R_x2$ and $R_{xy}$) to which the horizontal ($V_x$) and vertical ($V_y$) deflection signals are respectively applied, are connected to a common ground. The potentiometers provide variable output voltages $V_1$ and $V_2$, combined by summing resistors 122 and 124 to produce a voltage $V_3$ corresponding to the sum of the horizontal ($V_x$) and vertical ($V_y$) deflection signals.

In the circuit operation:

$$V_{101} = \alpha V_x \qquad (11)$$

$$V_{102} = \beta V_y \qquad (12)$$

$$V_{103} = \tfrac{1}{2}[V_{101} + V_{102}] = \tfrac{1}{2}[\alpha V_x + \beta V_y] \qquad (13)$$

here $\alpha$ has a value $0 \leq \alpha \leq 1$, depending on the position of potentiometer 118. Similarly, $0 \leq \beta \leq 1$ according to the setting of potentiometer 120. A pair of resistors 126 and 128 serve as a voltage divider to provide an output voltage $$V_{104} = \tfrac{1}{2}[V_x + V_y] \qquad (14)$$

which in turn is divided by a voltage divider comprising a pair of resistors 130 and 132 to produce a voltage $$V_{105} = \tfrac{1}{2}V_{104} = \tfrac{1}{4}[V_x + V_y] \qquad (15)$$

at input terminal $Y_2$ of multiplier 110.

Output terminal $Z_2$ is coupled across a grounded resistor 134 while output terminal $Z_1$ is itself grounded. Output terminal $Z_0$ is connected to a resistor 136 connected in series with resistor 134.

In the circuit operation:

$$V_{106} = \tfrac{1}{2} V_{out} \qquad (16)$$

$$V_{107} = 0 \qquad (17)$$

From equation (10), the output of multiplier 110 is:

$$V_{113} = V_{out} = 2(V_{106} - 0) = \qquad (18)$$
$$2 \frac{(V_x - 0)[\tfrac{1}{2}(\alpha V_x + \beta V_y) - \tfrac{1}{4}(V_x + V_y)]}{SF} =$$
$$\frac{V_x}{SF}[(\alpha - \tfrac{1}{2})V_x + (\beta - \tfrac{1}{2})V_y] =$$

-continued
$$\frac{\alpha - \tfrac{1}{2}}{SF} V_x^2 + \frac{\beta - \tfrac{1}{2}}{SF} V_x V_y$$

Consequently, as shown in equation, the output produced by multiplier 110 is proportional to the square $(V_x)^2$ and the product $(V_x V_y)$ of the horizontal and vertical deflection signals.

In the case of multiplier 112, the vertical deflection signal ($V_y$) is applied to its input terminal $X_1$ while input terminal $X_2$ is grounded. A potentiometer 140 (designated $R_y2$) responds to the vertical deflection signal ($V_y$) to apply a voltage $$V_{108} = \gamma V_y, \quad 0 \leq \gamma \leq 1 \qquad (19)$$

to input terminal $Y_1$ while a voltage divider comprising a pair of resistors 142 and 144 applies the voltage $$V_{109} = \tfrac{1}{2} V_y \qquad (20)$$

to input terminal $Y_2$. Output terminal $Z_1$ is grounded while output terminal $Z_2$ and $Z_0$ are coupled together. Thus, according to equation (10), the output of multiplier 112 is:

$$V_{114} = V_{out} = \frac{1}{SF}(V_y - 0)[\gamma V_y - \tfrac{1}{2} V_y] = \frac{\gamma - \tfrac{1}{2}}{SF} V_y^2 \qquad (21)$$

so that its output is proportional to the square of the vertical deflection signal.

The shading circuit includes a first operational amplifier 150 having its positive input grounded and its negative input coupled via a pair of summing resistors 152 and 154 to corresponding potentiometers 156 and 158 (designated $R_x$ and $R_y$, respectively) to respond to the horizontal ($V_x$) and vertical ($V_y$) deflection signals. Operational amplifier 150 is provided with a feedback resistor 160 coupled between its output terminal and negative input terminal. In the circuit operation, operational amplifier 150 produces an output voltage $$V_{110} = -2[V_{111} + V_{112}] \qquad (22)$$

where $V_{111}$ and $V_{112}$ are the output voltages of potentiometers 156 and 158, respectively. Since $V_{111}$ and $V_{112}$ are proportional to $V_x$ and $V_y$, respectively:

$$V_{110} = -2[\delta V_x + \epsilon V_y], \quad 0 \leq \delta, \epsilon \leq 1. \qquad (23)$$

The shading circuit also includes a resistor summing network comprising a pair of resistors 161 and 162 coupled to the outputs of multipliers 110 and 112, respectively, a pair of resistors 164 and 166 which respond directly to the horizontal and vertical deflection signals, and a resistor 168 coupled to the output of operational amplifier 150. The summing network is completed by a resistor 170 connected to a potentiometer 172 (designated $R_T$) which is provided to control the threshold of the summing network. The summing network is coupled to the negative input terminal of a second operational amplifier 174 having its positive input terminal grounded. A feedback resistor 176 is connected between its output terminal and negative input terminal. Operational amplifier 174 produces an output voltage $$V_{118} = V_{113} + V_{114} + V_{115} + V_{116} + V_{110} + V_{117}. \qquad (24)$$

Using the above values for these voltages:

$$V_{118}=(1/SF)[(\alpha-\tfrac{1}{2})V_x^2+(\beta-\tfrac{1}{2})V_xV_y+(\gamma-\tfrac{1}{2})V_y^2]-2(\delta-\tfrac{1}{2})V_y-2(\epsilon-\tfrac{1}{2})V_x+V_T. \quad (25)$$

As demonstrated in equation (25), the shading signal includes signal components proportional to the square ($V_x^2$) of the horizontal deflection signal, the product ($V_xV_y$) of the horizontal and vertical deflection signals, the square of the vertical deflection signal ($V_y^2$) and linear components proportional to the horizontal ($V_x$) and vertical ($V_y$) deflection signals. In addition, the shading signal includes a threshold voltage $V_T$. Potentiometer 118 ($R_x^2$) allows adjustment of the quadratic component corresponding to the square of the horizontal deflection signal. Similarly, by manual adjustment of potentiometer 120 ($R_{xy}$) and potentiometer 140 ($R_y2$) the quadratic components corresponding to the product of the horizontal and vertical deflection signals and to the square of the vertical deflection signal can be varied in magnitude. In addition, potentiometer 156 ($R_x$) and potentiometer 158 ($R_y$) can be adjusted to vary the magnitude of the linear signal components produced by operational amplifier 150. Finally, potentiometer 172 ($R_T$) can be adjusted to provide a threshold voltage for operational amplifier 174 and vary the overall intensity of the video display. Preferably, each of the operational amplifiers 150 and 174 is a type 356N manufactured by National Semiconductor.

Figure 7:
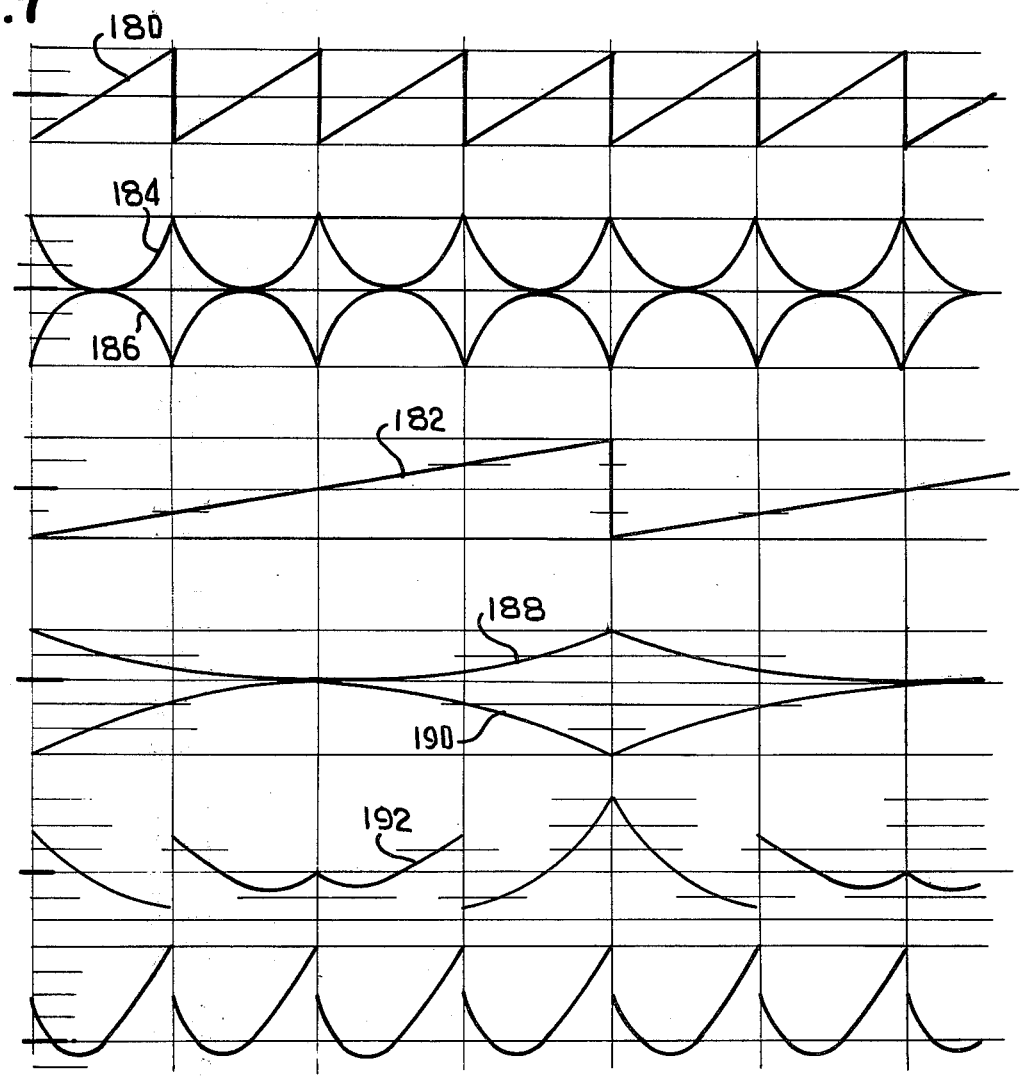
FIG. 7 illustrates waveforms produced in the operation of the shading circuit.

Referring to FIG. 7, the shading effects achieved by the shading circuit can be more readily understood by consideration of the waveforms associated with the quadratic signal components. Waveform A illustrates the horizontal scan deflection signal 180 which periodically varies linearly from a negative value $-V_x°$ to which a positive value $+V_x°$ over a predetermined time interval $T_1$. Similarly, waveform C illustrates the vertical scan deflection signal 182 which periodically varies linearly from a negative value $-V_y°$ to a positive value $+V_y°$ over a longer predetermined time interval $T_2$. Typically, there are 260 horizontal scan inverters $T_1$ for each vertical scan interval $T_2$.

As shown in waveform B, by adjustment of potentiometer $R_x2$, the quadratic signal component corresponding to $V_x2$ can be adjusted between positive and negative shading values defined by conics 184 and 186, respectively. When the adjustment is made utilizing lower curve 186 the effect on the video display is to brighten the darker edges around a bright spot and to decrease the intensity of the bright spot. Conversely, when the adjustment is made utilizing upper curve 184 the opposite result is achieved, i.e., the bright portions surrounding a dark area are darkened and the dark central area is brightened. As shown in waveform D, similar vertical adjustments can be made by adjustment of control potentiometer $R_y2$ utilizing upper and lower parabolic curves 188 and 190, respectively.

Waveform E illustrates a complex function 192 corresponding to the product $V_xV_y$ of the horizontal and vertical deflection signals. The effect illustrated by curve 192 can be superimposed on the video signal by appropriate adjustment of control potentiometer $R_{xy}$. Further, linear controls $R_x$ and $R_y$ may be adjusted to focus attention on a particular area of interest in the video display; for instance, curve F is produced by combining curves 180 and 184. Finally, control $R_T$ can be adjusted to increase and decrease the overall intensity of the video display.

Figure 8:
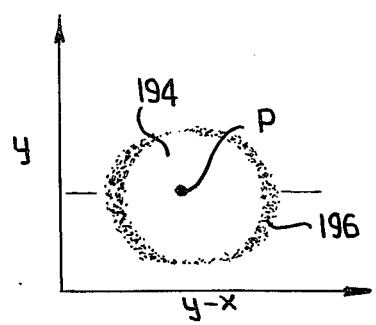
FIGS. 8 and 9 illustrate characteristics of the video display which can be modified by the shading circuit.
Figure 9:
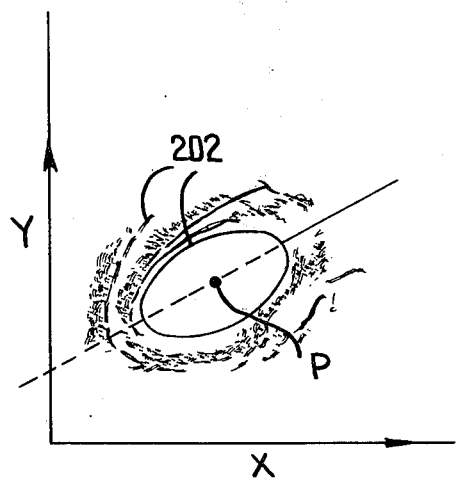

As illustrated in FIG. 8, the image produced on the video display may, for example, include a bright extremum point P at the center of an area 194 of excessive brightness surrounded by a region 196 of excessive darkness. Linear controls $R_x$ and $R_y$ can be adjusted by the operator to displace the extremum point P in the video display. In addition, quadratic controls $R_x2$ and $R_y2$ can be adjusted according to positive parabolic curves 186 and 190 (FIG. 7) to decrease the brilliance of the display in area 194 and to increase the brightness of dark region 196. As a result, the video signals corresponding to both regions are brought within the window of window amplifier 28 to more distinctly display the information in these regions. Consequently, by appropriate adjustment of the shading circuit, the operator is enabled to more effectively view contrasts in areas of excessive brilliance and areas of excessive darkness.

The shading circuit may also be adapted to achieve other types of non-linear controls. For example, rather than using the controls as in the above description which adjust the brightness profile in terms of its cartesian representation (x-y representation), it may be advantageous to use adjustment means which have directly a conic section significance (eccentricity, orientation and position of isodensity ellipses). The shading signal required to shade the video signal along an elliptical profile is:

$$V_s=K[E^{-1}(V_x\cos\alpha+V_y\sin\alpha)^2+E(-V_x\sin\alpha+V_y\cos\alpha)^2] \quad (26)$$

where x and y represent the horizontal and vertical coordinates, respectively, and $\alpha$ is the angular orientation of the elliptical axis. The required shading can be implemented with three controls, labeled K, E and $\alpha$, where K and E are gain controls and sin $\alpha$ and cos $\alpha$ are realized by ganged non-linear potentiometers. The gains $E^{-1}$ of the first term and E of the second term are realized by using ganged potentiometers having positive-logarithmic (for E) and negative-logarithmic (for $E^{-1}$) characteristics. The significance of these controls is: K gives the amplitude of the shading ellipse, E adjusts the eccentricity, and $\alpha$ the orientation of said ellipse. The position of the extremum point D is shifted by the linear $V_x,V_y$ controls, as in the above example. (These controls are not shown in FIG. 10.)

As shown in FIG. 10, the shading circuit includes a first set of ganged non-linear potentiometers 204 and 206 which are simultaneously adjustable to produce the functions cosine and sine, respectively. The potentiometer 204 responds to the horizontal deflection signal $V_x$ to produce an output proportional to $V_x\cos\alpha$, while potentiometer 206 responds to both $V_x$ and $-V_x$ via an inverter 188 to produce an output proportional to $-V_x\sin\alpha$. Similarly, a second set of ganged potentiometers 210 and 212 and an inverter 214 are employed to produce output signals proportional to $V_y\cos\alpha$ and $V_y\sin\alpha$. All these ganged pot-s are controlled by a single knob labeled $\alpha$.

The outputs of potentiometers 204 and 212 are applied to a summing network 216 to produce an output corresponding to $$V_y\cos\alpha+V_y\sin\alpha \quad (27)$$

which is squared by a multiplier 218 to produce an output corresponding to $$(V_x \cos \alpha + V_y \sin \alpha)^2 \qquad (28)$$

and applied via a potentiometer 227 to a summing network 220. Similarly, the outputs of potentiometers 206 and 210 are summed by a summing network 222 to produce an output corresponding to $$-V_x \sin \alpha + V_y \cos \alpha \qquad (29)$$

which is squared by a multiplier 224 to produce an output corresponding to $$(-V_x \sin \alpha + V_y \cos \alpha)^2 \qquad (30)$$

and applied via a potentiometer 226 to summing network 220. The output of summing network 220 is applied across a potentiometer 228 which produces an output on lead 230, adjustable by its setting K, where $0 \leq K \leq 1$. Note that in the position where potentiometer 226 is at "maximum gain," potentiometer 227 is at "minimum gain" as required by Equation (26).

$$V_{out} = K[E^{-1}(V_x \cos \alpha + V_y \sin \alpha)^2 + E(-V_x \sin \alpha + V_y \cos \alpha)^2] \qquad (26)$$

In consequence, the output voltage on lead 230 of the circuit indeed varies according to equation (26), and is the overall quadratic shading amplitude, E regulates the eccentricity of the shading ellipse, and $\alpha$ represents the angular orientation of the ellipse in the display. The position of extremum point P is adjusted by the linear shading controls ($R_x$ and $R_y$) of the previous embodiments.

The video display system of the present invention advantageously allows the operator to more accurately analyze the information contained in the X-ray photographs by superimposing a shading signal on the video signal used to produce the video display to selectively vary the intensity of the display in particular regions of interest. The system is provided with multiple controls to allow variable shading effects to be achieved by the operator to more distinctly display the information shown in the photograph. The system is particularly advantageous because it allows the operator to focus his attention on the important areas of the photograph. Although the invention has been particularly described in connection with medical applications, it is understood that the invention may be used in a wide range of applications where it is desirable to read x-ray or other photographs and improve the understanding of the information shown in the photographs.

As previously indicated, automatic shading may be provided alone or in combination with manual control. Automatic shading makes use of the previously stated concept that point to point control of brightness is not required and thus area control may be employed. Referring specifically to FIG. 11, in one example of application of the invention the screen is divided into 9 segments; 11, 12, 13; 21, 22, 23 and 31, 32, 33; each abutting its adjacent segments. The light level in each segment is controlled by the automatic shading circuit such that total black and total brightness are eliminated.

As previously indicated, the shading voltage is controlled by Equation 1: The voltage V may be expressed in terms of the individual shading voltages for each region of the screen. Thus:

| Y = 1 | $V_{11}$ | $V_{12}$ | $V_{13}$ |
| --- | --- | --- | --- |
| 0 | $V_{21}$ | $V_{22}$ | $V_{23}$ |
| −1 | $V_{31}$ | $V_{32}$ | $V_{33}$ |
| X = | −1 | 0 | 1 | where x and y have only the values of 1, 0, −1 providing 9 different permutations which are therefore capable of designating the 9 regions on the display. Further, the values of each of $V_{11}$ etc. may be determined remembering that A is a signal independent of the deflection voltages.

The signs and terms of the equation for $V_{11}$ are determined by the fact that X = −1 and Y = +1, when the monitor beam is in the upper left third of the tube, X and Y being the deflection voltages. Thus the signs of each term of the voltage expressions may be readily determined, for instance:

$$V_{11} = +1A - 1B + 1C + 1C + 1D - 1E \qquad (31)$$

The following equations result:

$$V_{11} = A - B_x + C_x^2 + D_y + E_y^2 - F_{xy} \qquad (32)$$

$$V_{12} = A + D_y + E_y^2 \qquad (33)$$

$$V_{13} = A + B_x + C_x^2 + D_y + E_y^2 + F_{xy} \qquad (34)$$

$$V_{21} = A - B_x + C_x^2 \qquad (35)$$

$$V_{22} = A \qquad (36)$$

$$V_{23} = A + B_x + C_x^2 \qquad (37)$$

$$V_{31} = A - B_x + C_x^2 - D_y + E_y^2 + F_{xy} \qquad (38)$$

$$V_{32} = A - D_y + E_y^2 \qquad (39)$$

$$V_{33} = A + B_x + C_x^2 - D_y + E_y^2 - F_{xy} \qquad (40)$$

From this set of equations, the Equations 2 through 7 previously set forth may be derived to define the value of each coefficient in terms of the voltages $V_{11}$–$V_{33}$.

The voltages $V_{11}$–$V_{33}$ each is the integral of the total of the signals in each region of the display. In the case of $V_{11}$, this signal is the integral of the aggregate of the video signals in the upper left ninth of the display. The B-F signals, more properly $V_\beta$–$V_F$ signals, are applied to the $M_x$, $M_x^2$, $M_y$, $M_y^2$ and $M_{xy}$ modulations as in the case of the manual circuit of FIG. 4 for instance where, however, the x and y signals are fed through without modulation.

Referring now to FIG. 12, there is illustrated the gate signal generator utilized to gate the video signals to the proper integrators.

The y deflection signal appears on lead 304 and is applied to discriminator 306 which produces a plus voltage on lead 308, 310 or 312 depending on whether the signal is intended to represent a 1, 0 or −1 respectively.

Figure 13:
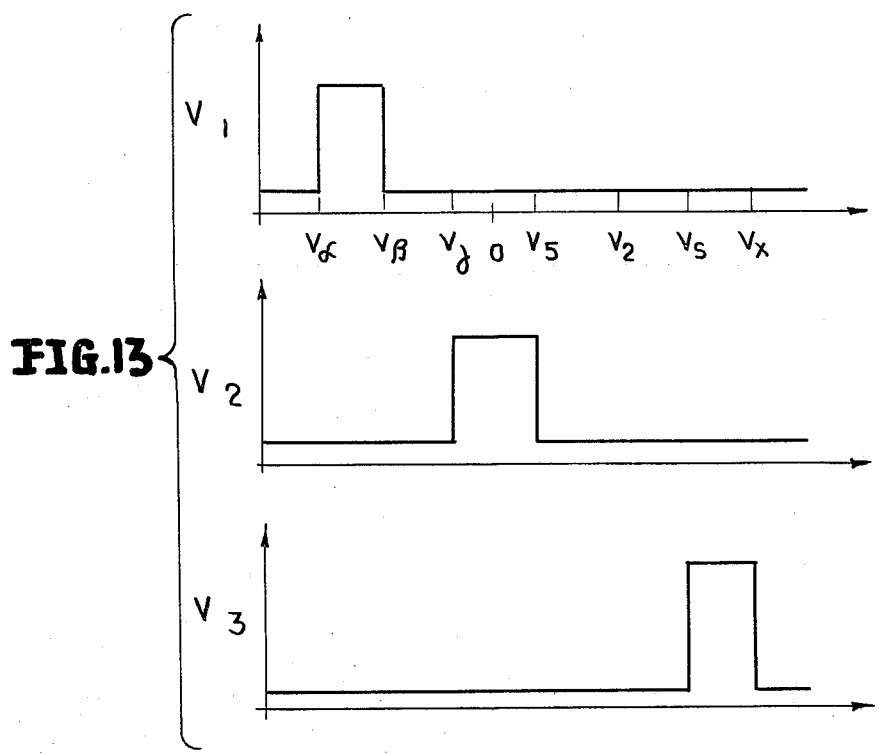
FIG. 13 illustrates a typical gating voltage produced by the discriminators of FIG. 12.

Referring to FIG. 13, the results of the operation of the discriminator are described. If the y deflection voltage falls within the range of $V_\alpha$–$V_\beta$; for instance +1 volt to +⅓ volt, a positive signal appears on lead 308 of FIG. 12 indicating y = +1. If the voltage falls in the range ⅓ volt to −⅓ volt, a voltage appears on lead 310 indicating a zero. If the voltage falls between −⅓ and −1 a voltage appears on lead 312. Thus, the voltages produced by the discriminator 306 define three regions of the screen which together with discriminator 314 which is supplied the x deflection signal via a lead 316 is capable of defining all 9 regions of the display.

The output signals of discriminator 314 appear on leads 318, 320 and 322 which together with signals on leads 308, 310 and 312 are supplied to a bank 324 of nine AND-Gates to provide output gate signals $S_{11}$, $S_{12}$, $S_{13}$, $S_{21}$, $S_{22}$, $S_{23}$, $S_{31}$, $S_{32}$ and $S_{33}$ corresponding with the regions 11-33 of the screen, respectively.

Figure 14:
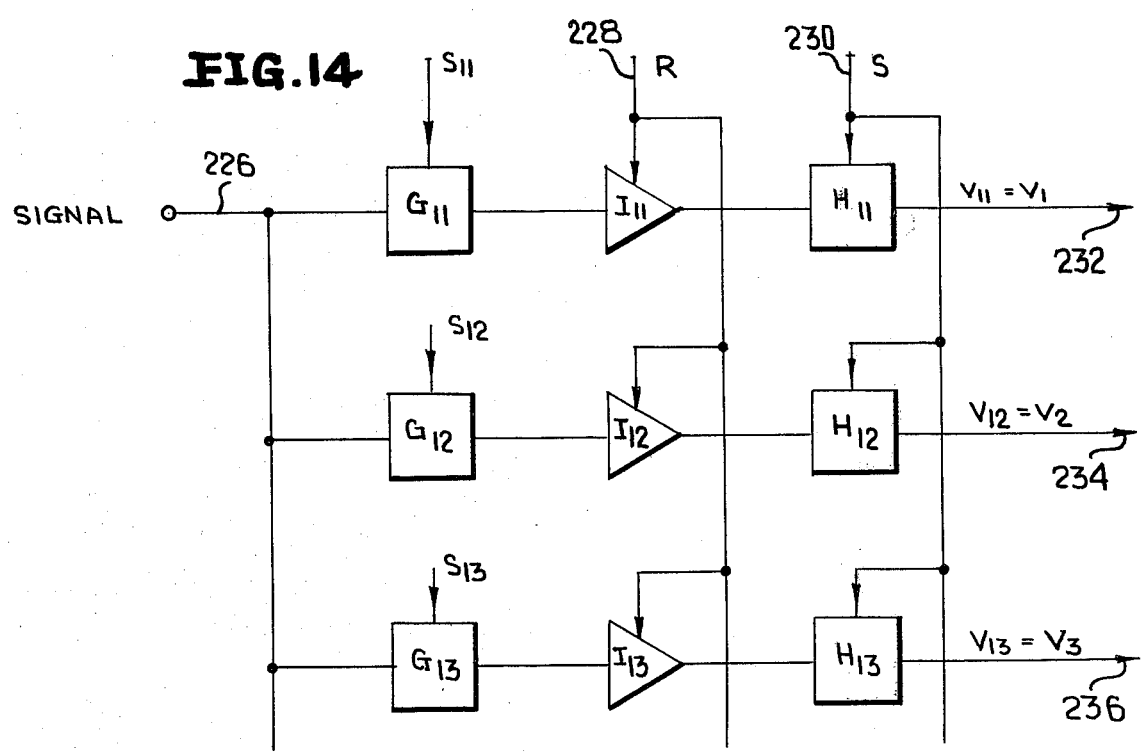
FIG. 14 is a block diagram of a signal integration and associated gates employed in the automatic shading voltage generator.

Referring now to FIG. 14 of the accompanying drawing, there is illustrated the integrating circuits of the invention. The video signal appears on lead 326 and is applied in parallel to all nine gates $G_{11}$ through $G_{33}$ only three of which are illustrated. The gates $G_{11}$-$G_{33}$ are gated, i.e. opened to pass signals to their respective integrators $I_{11}$-$I_{33}$ by the gate signals $S_{11}$-$S_{33}$ generated by the circuit of FIG. 12. Thus, at any time, the monitor beam is deflected into the region 11; the gate $G_{11}$ is opened and the video signal applied thereto.

The integrators have storage periods well in excess of the frame rate and each is reset by a signal R appearing on lead 328 and applied to all integrators in parallel at the end of each frame; 30 HZ for standard interlaced scan for instance. The output voltages of the integrators are applied to hold circuits $H_{11}$-$H_{33}$ which are activated in parallel by a signal S appearing on lead 330. The hold circuit is activated just prior to generation of the reset signal R whereby the stored signals are transferred to the hold circuits and then the integrators reset to receive information relating to the next frame.

The signals appearing on output leads 332, 334, 336 etc. of the hold circuits are the voltages V of the Equations 2 through 7. These voltages are applied to terminals 338-354 of FIG. 15 of the accompanying drawings, and through inverters 356-372 to leads 374-390, respectively. The leads 338-354 and 374-390 form a matrix with leads 392-402 on which are developed the voltages within the parentheses of Equations 2 through 7. Division for instance to produce the voltage of Equation 2, i.e. $V_A$, is affected by feedback resistors 404 around summation amplifier 406 connected between lead 392 and voltage terminal $V_A$.

The lead 392 is connected to leads 338, 342, 350 and 352 by 10 kohm resistors 408, 410, 412 and 414, respectively, to provide the voltages $-V_{11}$, $-V_{13}$, $-V_{31}$ and $-V_{33}$. The lead 392 is connected via 5 kohm resistors 416, 418, 420 and 422 to leads 376, 380, 384 and 388, respectively to provide voltages 2 $V_{12}$, 2 $V_{21}$, 2 $V_{23}$ and 2 $V_{32}$. The lead 392 is also connected via a 2 kohm resistor 324 to lead 382 to produce the voltage 5 $V_{22}$ thus satisfying the part of Equation 2 lying within the parenthesis.

The resistor 404 has a value of 1.1 kohms and thus the voltage on lead 392 is divided by nine and Equation 2 is satisfied.

The values of various resistors given above are not necessarily the true values of each resistor but represent the relative values of the resistors to one another although the values given may be employed.

Figure 15:
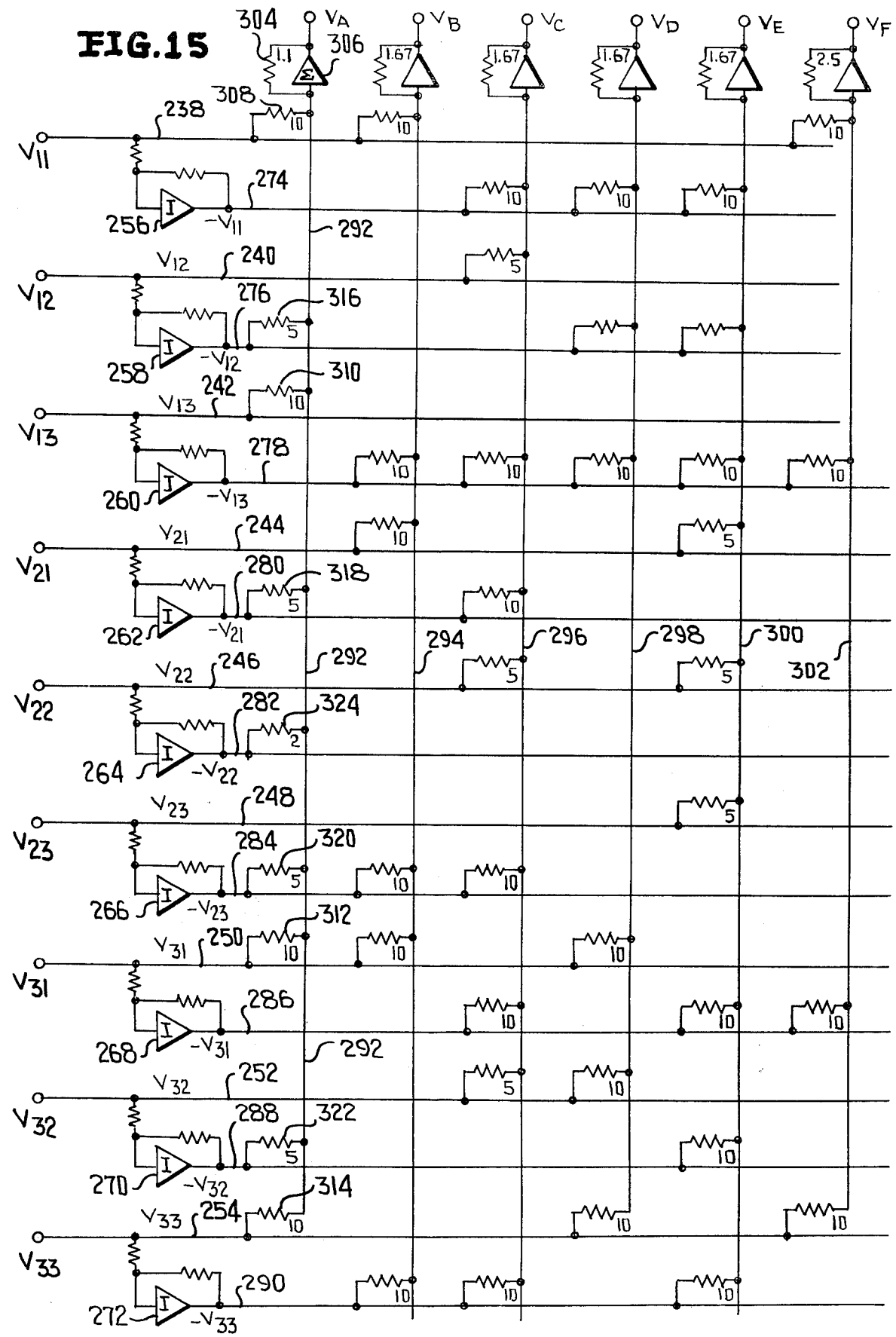
FIG. 15 is a schematic diagram of a matrix circuit for generating the coefficients for use in Equations 2-7.

The interconnections between each of the other leads in FIG. 15 is such as to satisfy the respective Equations 3-7 and the shading control voltages from each display tube sections are provided.

Referring now specifically to FIG. 16 of the accompanying drawings, there is illustrated a circuit for producing automatic as well as manual shading; the automatic shading signal conforming to Equation (1).

As in the totally manual circuits, the $V_x$ and $V_y$ deflection voltages are applied to leads 426 and 428, respectively. Lead 426 is connected to a multiplier 430 where the $V_x$ voltage is multiplied by the voltage $V_B$ the product Bx being applied to a lead 432 via an isolation resistor 434. The voltage on lead 426 is also applied to a lead 436 which supplies both inputs to a multiplier 438 to produce on lead 440 the voltage $V_x^2$. The lead 436 also supplies an input to multiplier 442 and is connected to one end of the resistor of a potentiometer 444 of the manual control.

The lead 440 is connected to one input of a multiplier 446 which receives as a second input the voltage $V_c$ to produce on lead 432 the $Cx^2$ term of the equation. The lead 440 is also connected via a lead 448 to a voltage divider circuit 450 to provide the term to the manual control circuit.

The lead 428 which carries the y deflection voltage is connected directly to one input circuit of a multiplier 452 which receives the voltage $V_D$ whereby to supply to lead 432 with the voltage Dy. The lead 428 is also connected to a lead 454 connected to two inputs of a multiplier 456 and to one input of the multiplier 442.

The output of the multiplier 456 is supplied to multiplier 458 which has supplied to a second input circuit the voltage $V_E$ whereby to produce on lead 432 the $Ey^2$ term. The multiplier 442 produces the xy term which is combined with the $V_F$ voltage in multiplier 460 to produce on lead 432 the Fxy term.

The voltage $y^2$ produced by the multiplier 456 is applied to a lead 460 which applies the $y^2$ voltage to a voltage divider 462. The lead 454 is connected to a variable voltage divider 464 to provide the $V_y$ voltage to the manual control. The multiplier 442 provides the $V_{xy}$ voltage to a lead 466 to supply variable voltage divider 468 with the $V_{xy}$ voltage. The $V_A$ voltage is applied directly to the lead 432 via an isolation resistor 468. Thus, the voltage $$V_A = V_A + V_B V_X + V_C V_X^2 + V_D V_Y + V_E V_Y^2 + V_F V_{XY} \qquad (1)$$

is developed on lead 432 as well as the manually variable x, $x^2$, y, $y^2$ and xy voltages from the voltage dividers 444, 450, 464, 462 and 468 respectively. A final voltage $V_o$, a threshold control voltage, is applied to lead 432 from potentiometer 470 via an isolation resistor 72 to provide the manual control voltage.

$$V_M = V_o + a_x V_x + a_{x2} V_{x2} + a_y V_y + a_{y2} V_{y2} + a_{xy} V_{xy}$$

where $a$ represents the manual setting of the potentiometer of the voltage divider circuits.

The voltages on lead 332 are summed by amplifier 472 and then applied to the window amplifier of, for instance, the window amplifier of FIG. 2.

It is apparent that depending upon the choice of the many different configurations of IC's on the market, that many variants of the circuits illustrated are available. The choice of multi-function chips incorporating gates, amplifiers, comparators, integrators, etc. makes end choices almost infinite and the circuits illustrated are intended to provide a disclosure of the circuitry presently employed to achieve the desired result, without limiting such disclosure to the specific circuits.

The present invention is not limited to the specific details shown and described, and modifications may be made in the specific embodiments described above without departing from the principles of the invention.

I claim:

1. In a video display system utilizing horizontal and vertical deflection signals and a video signal to produce a video display, a control circuit for selectively varying the intensity of the video display, comprising:

first means responsive to the horizontal and vertical deflection signals for producing a plurality of signal components corresponding to linear and non-linear functions of the deflection signals;

second means for combining the said plurality of said components with the video signal to produce a shaded video signal; and third means for varying said plurality of signal components for controlling the intensity of the video display.

2. The system of claim 1, wherein said first means includes means for producing non-linear signal components corresponding to higher order functions of the horizontal and vertical deflection signals.

3. The system of claim 2, wherein means for producing non-linear signal components corresond to quadratic functions of the horizontal and vertical deflection signals.

4. The system of claims 1 or 2 wherein:

said third means is adapted to vary the magnitude of the non-linear signal components according to trigonometric relationships determined by the angular orientation of a selected portion of the video display.

5. In a video display system utilizing horizontal ($V_x$) and vertical ($V_y$) deflection signals and a video signal to produce a video display, a control circuit for selectively varying the intensity of the video display, comprising:

first means responsive to the horizontal ($V_x$) and vertical ($V_y$) deflection signals for producing a plurality of signals including quadratic signal components corresponding to functions of $(V_x)^2$, $(V_xV_y)$ and $(V_y)^2$ and linear signal components corresponding to $(V_x)$ and $(V_y)$;

means for combining said plurality of signals with the video signal to produce a shaded video signal for controlling the intensity of the video display; and circuit means for varying the magnitude of said quadratic and linear components of said plurality of signals.

6. The system of claim 5, wherein said first means includes:

multiplier means responsive to the horizontal ($V_x$) and vertical ($V_y$) deflection signals for producing an output including quadratic signal components proportional to functions of $(V_x)^2$, $(V_xV_y)$ and $(V_y)^2$; and summing means responsive to the output of said multiplier means and to the horizontal ($V_x$) and vertical ($V_y$) deflection signals for producing an output proportional to the summation of the signals corresponding to functions of $(V_x)^2$, $(V_xV_y)$, $(V_y)^2$, $(V_x)$ and $(V_y)$.

7. The system of claim 6, wherein said first means includes:

the threshold control means coupled to said summing network for adjusting the threshold of said summing network.

8. The system of claim 5, wherein said signal combining means comprises:

a differential amplifier responsive to the video and shading signals for producing an output corresponding to the difference between the video signal and the shading signal.

9. The system of claim 6, wherein said multiplier means includes:

a first multiplier responsive to the horizontal ($V_x$) deflection signal for producing a signal component proportional to the square $(V_x)^2$ of the horizontal deflection signal;

a second multiplier responsive to the horizontal ($V_x$) and vertical ($V_y$) deflection signals for producing a signal component proportional to the product $(V_xV_y)$ of the deflection signals; and a third multiplier responsive to the vertical ($V_y$) deflection signal for producing a signal component proportional to the square $(V_y)^2$ of the vertical deflection signal.

10. The system of claim 9, wherein said circuit means includes:

a set of potentiometers coupled to inputs of said multipliers for controlling the magnitude of the quadratic signal components corresponding to $(V_x)^2$, $(V_xV_y)$ and $(V_y)^2$.

11. The system of claim 10, wherein said circuit means includes:

an additional set of potentiometers individually responsive to the horizontal ($V_x$) and vertical ($V_y$) deflection signals for adjusting the magnitude of the linear signal components corresponding to $(V_x)$ and $(V_y)$.

12. The system of claim 6, wherein said multiplier means includes:

a first multiplier circuit responsive to one of the deflection signals for producing a signal component corresponding to the square of one of said deflection signals; and a second multiplier circuit responsive to both deflection signals for producing signal components corresponding to the sum of the product of both deflection signals and the square of the other deflection signal.

13. The system of claim 12, wherein said circuit means includes:

a set of potentiometers responsive to the horizontal and vertical deflection signals and coupled to said first and second multiplier circuits for controlling the magnitude of the quadratic signal components.

14. The system of claim 13, wherein said circuit means includes:

an additional set of potentiometers individually responsive to the deflection signals and coupled to said summing means for adjusting the magnitude of the lienar signal components.

15. The combination according to claim 5 or 6 comprising means for producing a further plurality of signals each indicative of the average intensity of the video signals to be applied to a specific distinct area of a video display means;

said circuit means varying the relative magnitude of each of said quadratic and linear components of said plurality of signals by a different function of said further plurality of signals.

16. The system of claim 15 wherein said different functions of said further plurality of signals are determined by the Equations $$A = 1/9(-V_{11} + 2V_{12} - V_{13} + 2V_{21} + 5V_{22} + 2V_{23} - V_{312}V_{32} - V_{33})$$

$$B = 1/6(-V_{11} + V_{13} - V_{21} + V_{23} - V_{31} - V_{33})$$

$$C = 1/6(V_{11} - 2V_{12} + V_{13} + V_{21} - 2V_{22} + V_{23} + V_{31} - 2V_{32} + V_{33})$$

$$D = 1/6(V_{11} + V_{12} + V_{13} - V_{31} - V_{32} - V_{33})$$

$$E = 1/6(V_{11} + V_{12} + V_{13} - 2V_{21} - 2V_{22} - 2V_{23} + V_{31} + V_{32} + V_{33})$$

$$F = \tfrac{1}{4}(-V_{11} + V_{13} + V_{31} - V_{33})$$

where $V_{11}, V_{12}, V_{13}, V_{21}, V_{22}, V_{23}, V_{31}, V_{32}, V_{33}$ each define a different one of said further plurality of signals.

17. The system of claim 16 wherein said means for producing a further plurality of signals comprises further means for multiplying each of said linear and quadratic signals by a different one of said further plurality of voltages to produce a shading signal, $$V = A + BV_x + C(V_x)^2 + DV_y + E(V_y)^2 + FV_xV_y.$$

18. The system of claim 17 wherein said further means for multiplying includes multiplier means for producing $(V_x)^2$, $(V_y)^2$ and $V_xV_y$ and for producing $BV_x$, $C(V_x)^2$, $DV_y$, $E(V_y)^2$ and $FV_xV_y$ and means for combining said signal $V$ with signals represent $\alpha_xV_x$, $\alpha_{xx}(V_x)^2$, $\alpha_yV_y$, $\alpha_{yy}(V_y)^2$ and $\alpha_x\alpha_yV_xV_y$ where $\alpha_i$ is a series of independently variable parameters.

19. In a video display system including a video camera or other input device and a video display device operable by horizontal and vertical deflection signals for producing a video display in response to a video signal generated by the video camera or other input device:
shading means responsive to the horizontal and vertical deflection signals for superimposing a shading signal including a plurality of signal components corresponding to linear and non-linear functions of the deflection signals on the video signal to produce a shaded video signal to operate said video display device, said shading means being adjustable to vary the linear and non-linear signal components to allow a selected portion of the video display to be shaded to eliminate areas of excessive brightness or darkness.

20. The system of claim 19, wherein:
said shading means is adapted to produce non-linear signal components corresponding to higher order functions of the horizontal and vertical deflection signals.

21. The system of claim 19, wherein:
said shading means is adapted to produce non-linear signal components corresponding to quadratic functions of the horizontal and vertical deflection signals.

22. The system of claim 19, wherein:
said shading means is adapted to vary the magnitude of the non-linear signal components according to trigonometric relationships determined by the angular orientation of the selected portion of the video display.

23. The video display system of claim 19 which includes:
a low pass filter connected to said video camera for eliminating high frequency components from the video signal and supplying a filtered video signal to said shading means; and
a window amplifier coupled to said shading means for supplying the shaded video signal to said video display device, said window amplifier being operable to expand the amplitude differences of the shaded video signal lying within a predetermined amplitude range.

24. The system of claim 23, wherein said shading means includes:
a differential amplifier for combining the shading signal with the filtered video signal to produce a shaded video signal corresponding to the difference therebetween.

25. The system of claim 23, wherein said shading means includes:
multiplier means responsive to the horizontal and vertical deflection signals for producing an output including quadratic components proportional to the squares of the horizontal and vertical deflection signals and the product of both deflection signals; and
summing means responsive to the output of said multiplier means and to the horizontal and vertical deflection signals for producing an output proportional to the summation of the quadratic signal components and both deflection signals.

26. The system of claim 25, wherein said shading means includes:
threshold control means coupled to said summing network for adjusting the threshold of said summing network.

27. A method of shading a video display produced by horizontal and vertical deflection signals and a video signal to selectively control the intensity of the video display, comprising:
combining the horizontal and vertical deflection signals to produce a first plurality of signal components corresponding to linear and non-linear functions of the deflection signals;
combining the plurality of signals with the video signal to produce a shaded video signal; and
adjusting the magnitude of the linear and non-linear components of the shading signals to control the intensity of the video display.

28. The method of claim 27, wherein the non-linear components of the shading signal correspond to higher order functions of the horizontal and vertical deflection signals.

29. The method of claim 27, wherein the non-linear components of the shading signal correspond to quadratic functions of the horizontal and vertical deflection signals.

30. The method of claim 27 which includes:
varying the magnitude of the non-linear signal components according to trigonometric relationships determined by the angular orientation of a selected portion of the video display.

31. The method of claim 27, wherein the shading signal and the video signal are combined to produce the shaded video signal which corresponds to the difference between the video signal and the shading signal.

32. The method of claim 27, wherein the magnitude of the linear and non-linear components of the shading signal are adjusted to shade a selected portion of the video display to eliminate areas of excessive brightness or darkness.

33. The method of claim 27 producing a second plurality of signals each indicative of the average intensity of the video signals to be applied to a specific district area of a video display; and
varying the relative magnitudes of each of the quadratic and linear components of the first plurality of signals by a different one of the second plurality of signals.

* * * * *